(12) United States Patent
Smith

(10) Patent No.: US 7,493,347 B2
(45) Date of Patent: Feb. 17, 2009

(54) METHOD FOR CONDENSING REPORTED CHECKPOINT LOG DATA

(75) Inventor: Alan Ray Smith, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 11/143,137

(22) Filed: Jun. 2, 2005

(65) Prior Publication Data

US 2006/0277162 A1 Dec. 7, 2006

(51) Int. Cl.
  G06F 7/00 (2006.01)
  G06F 17/30 (2006.01)
(52) U.S. Cl. .................. 707/202; 707/203; 707/204
(58) Field of Classification Search ............... 707/1–10; 709/205; 719/318
See application file for complete search history.

(56) References Cited

U.S. PATENT DOCUMENTS

| | | | | |
|---|---|---|---|---|
| 5,721,918 | A | | 2/1998 | Nilsson et al. ............. 395/618 |
| 5,832,515 | A | * | 11/1998 | Ledain et al. ............. 707/202 |
| 5,978,940 | A | * | 11/1999 | Newman et al. ........... 714/712 |
| 5,987,633 | A | * | 11/1999 | Newman et al. ........... 714/712 |
| 6,006,225 | A | * | 12/1999 | Bowman et al. .............. 707/5 |
| 6,021,408 | A | * | 2/2000 | Ledain et al. ................ 707/8 |
| 6,035,399 | A | * | 3/2000 | Klemba et al. ............... 726/1 |
| 6,088,693 | A | * | 7/2000 | Van Huben et al. ........... 707/8 |
| 6,192,365 | B1 | * | 2/2001 | Draper et al. ............. 707/101 |
| 6,463,501 | B1 | * | 10/2002 | Kern et al. ................ 711/100 |
| 6,701,345 | B1 | * | 3/2004 | Carley et al. .............. 709/205 |
| 7,020,697 | B1 | * | 3/2006 | Goodman et al. .......... 709/223 |
| 7,200,777 | B1 | * | 4/2007 | Bouchee .................... 714/45 |
| 2003/0182310 | A1 | * | 9/2003 | Charnock et al. ........ 707/104.1 |
| 2003/0212660 | A1 | * | 11/2003 | Kerwin ....................... 707/1 |
| 2003/0217033 | A1 | * | 11/2003 | Sandler et al. ................ 707/1 |
| 2004/0044642 | A1 | | 3/2004 | Fujii et al. ..................... 707/1 |
| 2004/0193945 | A1 | * | 9/2004 | Eguchi et al. ................. 714/6 |
| 2004/0194114 | A1 | * | 9/2004 | Spiegel ...................... 719/318 |
| 2004/0199540 | A1 | * | 10/2004 | Nojima ....................... 707/102 |

(Continued)

FOREIGN PATENT DOCUMENTS

JP 2001318809 A 11/2001

OTHER PUBLICATIONS

Microsoft Computer Dictionary, 2002, Microsoft Corporation, Microsoft Press, Fift Edition, p. 184.*

(Continued)

*Primary Examiner*—Jean M Corrielus
*Assistant Examiner*—Angelica Ruiz
(74) *Attorney, Agent, or Firm*—Kunzler & McKenzie

(57) ABSTRACT

A method is disclosed for condensing reported checkpoint log data that facilitates analysis of the checkpoint log data by minimizing extraneous results presented to a user. The method includes a user interface to receive a query expression from a user based on one or more conditions and one or more parameters. A record handler retrieves a checkpoint log record from a storage device. A structuring module parses the checkpoint log record into log entries. A comparison module applies the query expression to each log entry. This application of the query expression may include applying the query expression to a particular portion of the log entry specified by an offset. The output module generates a condensed checkpoint log record including log entries that satisfy the query expression.

12 Claims, 6 Drawing Sheets

U.S. PATENT DOCUMENTS

| | | | |
|---|---|---|---|
| 2005/0114285 A1* | 5/2005 | Cincotta | 707/1 |
| 2005/0138081 A1* | 6/2005 | Alshab et al. | 707/200 |
| 2005/0138483 A1* | 6/2005 | Hatonen et al. | 714/45 |
| 2005/0278394 A1* | 12/2005 | Oks et al. | 707/202 |
| 2006/0053121 A1* | 3/2006 | Zizys et al. | 707/100 |
| 2006/0117091 A1* | 6/2006 | Justin | 709/217 |
| 2006/0218200 A1* | 9/2006 | Factor et al. | 707/200 |

OTHER PUBLICATIONS

Thorsten Fiebig, Anatomy of a native XML base management system, Dec. 13, 2002, Springer-Verlag 2002, pp. 292-314.*

* cited by examiner

METHOD FOR CONDENSING REPORTED CHECKPOINT LOG DATA

BACKGROUND OF THE INVENTION

1. Field of the Invention

This invention relates to log data and more particularly relates to condensing checkpoint log data.

2. Description of the Related Art

Computer software generally includes a log feature that may be used during development or during normal operation of a software application. The log feature causes the software application to report various types of information regarding the health or status of each software sub-system, statistics from system control blocks, and other highly detailed information known herein as log data. Generally, log data is analyzed by software engineers or system administrators to facilitate resolving software bugs and/or inefficiencies in the software application. Typically, log data can be produced at various levels of granularity. The different levels of granularity facilitate tracking down software errors.

However, a high granularity also produces very large quantities of log data. For each software event logged, a log entry is typically generated. The log entry is typically relatively small and provides information about the operation being performed as well as context information such as inputs, outputs, and other state information.

Log data is typically stored for subsequent analysis after the software application is executed to generate the software error. Because log data may be collected during high workload periods for the computer system and/or software application, it is desirable that the logging operation add minimal overhead to the workload. Consequently, the frequently-generated log entries are typically combined into larger groups of log entries, known herein as checkpoint log records. The checkpoint log records often include a header that identifies the number and length of log entries contained therein as well as other context information such as a timestamp. Checkpoint log records can be over one hundred times larger than individual log entries. Storing fewer large checkpoint log records requires less I/O than storing many small individual log entries.

Log data can be collected during a single execution or over a period of time in order to identify more latent software bugs. Consequently, the size of the log data may grow dramatically. Analyzing such high quantities of log data has been difficult for programmers and system administrators. With the complexities of modern software and the high quantities of log data, the debugging task becomes the proverbial search for a needle in a haystack.

Storing checkpoint log records optimizes writing to the storage devices, but makes reviewing and analysis extremely difficult. In particular, search utilities currently available such as DFSERA10 provided with the Information Management System (IMS) from IBM of Armonk, N.Y., do not permit searching for a data value within individual log entries. Instead, the whole checkpoint log record is treated as a continuous, unstructured record. These conventional tools search checkpoint log records for any occurrence of the search string or data value. Consequently, conventional search tools find matching data values, also known as "hits," at various locations within a checkpoint log record. Unfortunately, these hits cross boundaries between log entries, boundaries within log entries, or occur at the wrong location within a log entry such that the hits are coincidental and of no use to the programmer. Such hits are false positives.

In addition, conventional search tools retrieve and present each checkpoint log record that includes at least one hit. Typically, this means that a high number of non-matching log entries are presented with the one or two log entries that contain the hit. Storing, printing, displaying, and sifting through the non-matching log entries together with the actual hit log entries can be tedious and labor intensive for programmers and system administrators concentrating on tracking down a software problem. The non-matching log entries make the results difficult to read. Furthermore, if the hit is a false positive, the receiving of these log records is wasted. In some instances, millions of lines of output are returned, the majority of which are extraneous.

From the foregoing discussion, it should be apparent that a need exists for a method for condensing reported checkpoint log data based on a query expression. The method should minimize false positives and the size of search results to ease storage requirements and log data analysis time.

SUMMARY OF THE INVENTION

The present invention has been developed in response to the present state of the art, and in particular, in response to the problems and needs in the art that have not yet been fully solved by currently available log data analysis methods. Accordingly, the present invention has been developed to provide a method for condensing reported checkpoint log data that overcome many or all of the above-discussed shortcomings in the art.

The apparatus for condensing reported checkpoint log data is provided with a logic unit containing a plurality of modules configured to functionally execute the steps of condensing reported checkpoint log data. These modules in the described embodiments include an input module, a record handler, a structuring module, a comparison module, and an output module.

The input module receives a query expression from a user. The query expression is used to locate relevant log entries within a checkpoint log record. In one embodiment, the query expression includes at least one condition and at least one parameter. In addition, the query expression may include an offset value. The offset value is used to apply the query expression to data located in a specific location of a log entry. In another embodiment, the query expression includes an exclude condition used to exclude log entries satisfying the condition from the condensed log record.

The record handler retrieves a checkpoint log record from a storage device. The checkpoint log record contains structured log entries. In one embodiment, the record handler retrieves one or more checkpoint log records satisfying a time stamp condition from the storage device.

The structuring module parses the checkpoint log record into individual log entries. In one embodiment, the log entries contained by the checkpoint log record are all of the same type. In yet another embodiment, the structuring module reads an entry count and entry size from a checkpoint log record header. The entry count and entry size enable the structuring module to demarcate log entries within the checkpoint log record. The comparison module applies the query expression to each log entry and determines which log entries satisfy the query expression.

The output module generates a condensed checkpoint log record that contains only those log entries that satisfy the query expression. In the case of a query expression containing an exclude condition, the output module excludes log entries satisfying the condition from the condensed checkpoint log record. In one embodiment, the output module condenses the checkpoint log record by discarding log entries in the checkpoint log record that do not satisfy the query expression. Alternatively, the output module generates a new checkpoint log record containing those log entries that satisfy the query expression. In another embodiment, the output module presents the condensed checkpoint log record to a user by passing the condensed checkpoint log record to an Information Management System (IMS) formatting utility.

A system of the present invention is also presented for condensing reported checkpoint log data. The system may include the modules of the apparatus. In addition, the system, in one embodiment, includes a processor, a storage device, Input/Output (I/O) devices, a communication bus, and a memory. The processor executes software to manage operations of the system. The storage device stores a plurality of checkpoint log records. The I/O devices interact with a user. The communication bus operatively couples the processor, storage device, I/O devices, and memory.

The memory may include a user interface, the input module, the record handler, structuring module, comparison module, and output module discussed above. A user may provide the query expression using the I/O devices. Additionally, the contents of the condensed checkpoint log record may be displayed for the user using the I/O devices.

A method for deploying computing infrastructure capable of condensing reported checkpoint log data is provided. The method in the disclosed embodiments substantially includes the steps necessary to carry out the functions presented above with respect to the operation of the described apparatus and system. The computing infrastructure receives a query expression from a user. Next, a checkpoint log record is read from a file and parsed into log entries. A query expression comprising a condition and one or more parameters is applied to each log entry. Log entries that satisfy the query expression are included in a condensed checkpoint log record. In one embodiment of the method the condensed checkpoint log record is presented to an Information Management System (IMS) formatting utility.

The method searches checkpoint log data on the log entry level. The method minimizes false positives and condensed reported checkpoint log data by separating log entries having matches from extraneous log entries. Smaller search results ease storage requirements and checkpoint log data analysis time. These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION OF THE INVENTION

Figure 1:
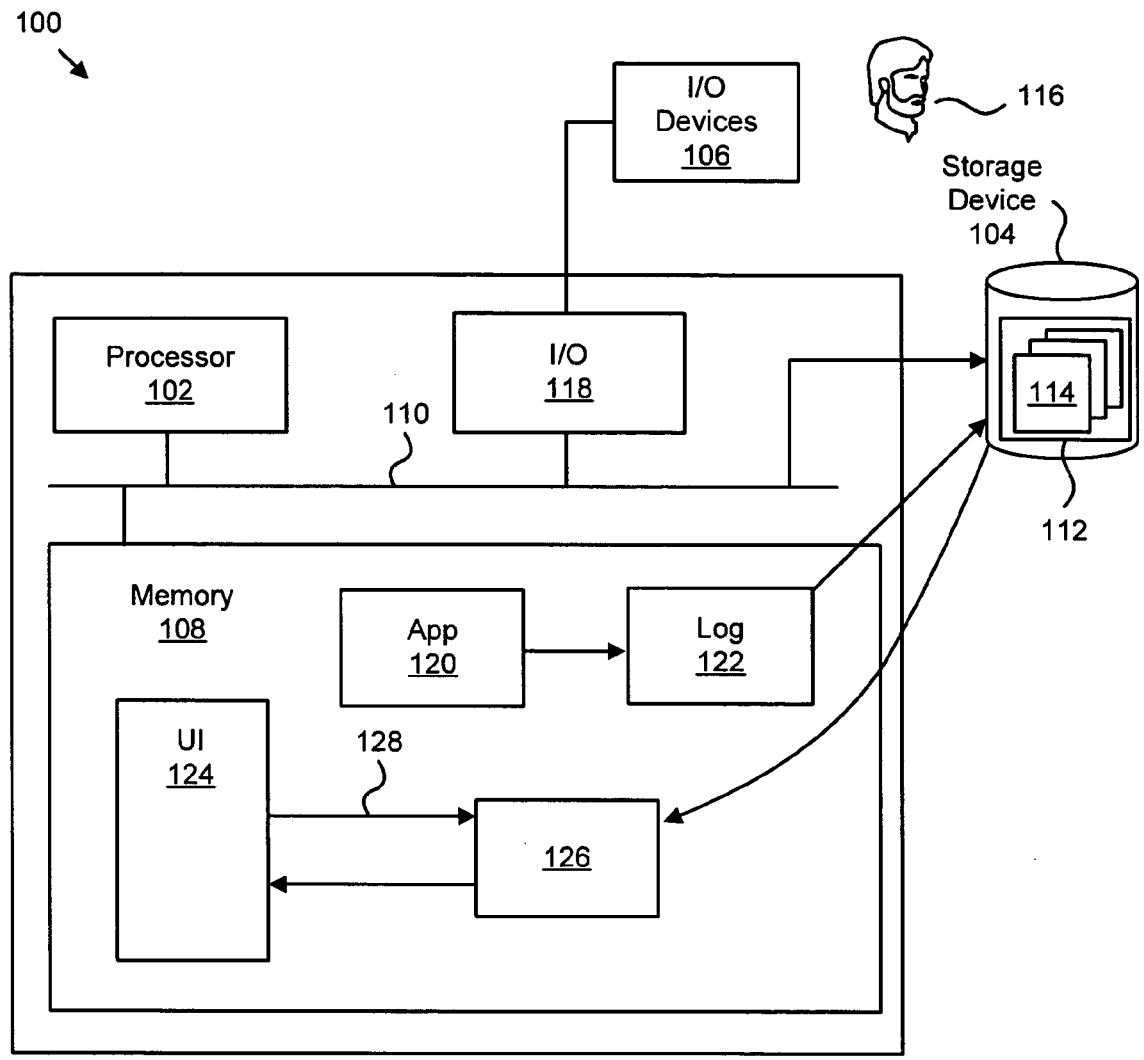
FIG. 1 is a block diagram illustrating one embodiment of a system for condensing reported checkpoint log data in accordance with the present invention.

FIG. 1 illustrates one embodiment of a system 100 for condensing reported checkpoint log data. The system 100 includes a processor 102, a storage device 104, I/O devices 106, a memory 108, and a communication bus 110. Those of skill in the art will recognize that the system 100 may be more simple or complex than illustrated so long as the system 100 includes modules or sub-systems that correspond to those described herein. In one embodiment, the system 100 comprises hardware and/or software more commonly referred to as a Multiple Virtual Storage (MVS), OS/390, zSeries/Operating System (z/OS), UNIX, Linux, or Windows system 100.

Typically, the processor 102 comprises one or more central processing units executing software and/or firmware to control and manage the other components within the system 100. The storage device 104 provides persistent storage of data. In particular, the storage device 104 stores one or more data sets 112. Each data set 112 preferably includes a plurality of records 114, for example checkpoint log records 114.

The I/O devices 106 permit a user 116 to interface with the system 100. In one embodiment, the user 116 provides a query expression. Alternatively, query expressions may be stored in a script, software code, or the like. The I/O devices 106 include standard devices such as a keyboard, monitor, mouse, and the like. I/O devices 106 are coupled to the communication bus 110 via one or more I/O controllers 118 that manage data flow between the components of the system 100 and the I/O devices 106.

The communication bus 110 operatively couples the processor 102, memory 108, I/O controllers 118, and storage device 104. The communication bus 110 may implement a variety of communication protocols including Peripheral Communication Interface, Small Computer System Interface, and the like.

The memory 108 may include an application 120, a log module 122, a User Interface (UI) 124 and a reduction module 126. The application 120 may comprise any software application configured to interface with the log module 122. For example, the application 120 may comprise a transaction and database management system such as Information Management System (IMS) from IBM of Armonk, N.Y.

The log module 122 comprises a software module configured to monitor the application 120 and generate log entries representative of certain operations, data, and events that occur in relation to the application 120. The log module 122 is further configured to minimize I/O overhead in the system 100 by bundling a plurality of log entries into a checkpoint log record 114 that the log module 122 stores in data sets 112. The log module 122 may be integrated with or separate from the application 120.

When a user 116 desires to condense a checkpoint log record data set 112, the user 116 defines a query expression 128 within the UI 124. Rather than just a simple search string as in conventional systems, the query expression 128 comprises one or more conditions and one or more parameters. The conditions and parameters permit the user 116 more control over the search results and are explained in more detail below.

The UI 124 may comprise a command line interface, an entry panel-driven interface, a Graphical User Interface (GUI), a batch interface, or a combination of these. The user 116 enters predefined commands, operators, and data values into the UI 124 to define the query expression 128. Preferably, the UI 124 checks user input to ensure that syntax and semantics rules are satisfied.

The UI 124 provides the query expression 128 to the reduction module 126. Alternatively, a script, software code, or the like may provide the query expression to the reduction module 126. In one embodiment, based on the parameters, the reduction module 126 retrieves a checkpoint log record 114 from a particular data set 112. The reduction module 126 applies the query expression to each log entry within the checkpoint log record 114. Log entries that satisfy the query expression are collected in a condensed checkpoint log record and log entries that fail to satisfy the query expression are discarded.

Of course, the reduction module 126 may retrieve a plurality of checkpoint log records 114 and apply the query expression to each log entry within each of the plurality of checkpoint log records. Log entries that satisfy the query expression may be collected in a single condensed checkpoint log record or in a plurality of condensed checkpoint log records corresponding to the plurality of checkpoint log records.

The reduction module 126 may provide the condensed checkpoint log record to the UI 124 in a raw unformatted condition such that the UI 124 may format the condensed checkpoint log record.

Figure 2:
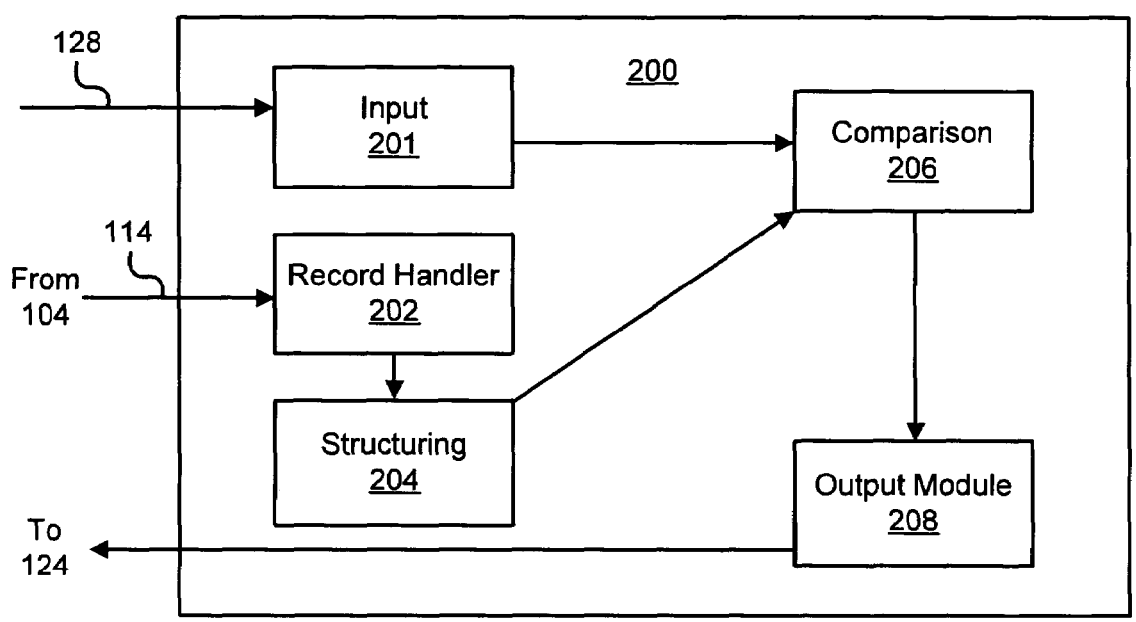
FIG. 2 is a block diagram illustrating one embodiment of an apparatus for condensing reported checkpoint log data in accordance with the present invention.

FIG. 2 illustrates one embodiment of a reduction module 200. Preferably, the reduction module 200 is configured to serve as the reduction module 126 described in relation to FIG. 1. The reduction module 200 includes an input module 201, a record handler 202, a structuring module 204, a comparison module 206, and an output module 208. The input module 201 receives a query expression 128 from the user interface 124. Alternatively, the input module 201 may receive a query expression 128 from a script, software code, or the like.

The record handler 202 retrieves one or more checkpoint log records 114 from a set of checkpoint log records 114 located on the storage device 104. Alternatively, the storage device 104 includes a single checkpoint log record 114. The record handler 202 may retrieve a subset of the set of checkpoint log records 114 based on a time span expression. The record handler 202 determines if a checkpoint log record 114 satisfies the time span expression by examining a time stamp located in each checkpoint log record 114.

For example, the time span expression may comprise the date range Apr. 1, 2005 to Apr. 5, 2005. Based on this time span expression, the record handler 202 will examine all checkpoint log records 114 and retrieve those with time stamps falling within the range Apr. 1, 2005 and Apr. 5, 2005.

Preferably, the record handler 202 retrieves a plurality of checkpoint log records 114 in a single request to minimize I/O requests. Alternatively, the record handler 202 may retrieve each checkpoint log record 114 individually. The record handler 202 preferably passes one checkpoint log record 114 at a time to the structuring module 204.

The structuring module 204 parses the checkpoint log record 114 into log entries. Preferably, each of the log entries within a single checkpoint log record 114 has the same format and length. In one embodiment, the structuring module 204 reads an entry count and an entry size from a header of the checkpoint log record 114. Preferably the header is located at the beginning of the checkpoint log record 114. The entry count specifies how many log entries are contained in the checkpoint log record 114. The entry size specifies the length, typically in bytes, of each log entry. The structuring module 204 demarcates each log entry by utilizing the entry size to find the beginning of each log entry within the checkpoint log record 114. Once the structuring module 204 has located a log entry, the structuring module 204 parses the log entry and stores the entry in a variable, structure, file, software, object, or the like.

The structuring module 204 and comparison module 206 may cooperate to apply the query expression 128 to each log entry of the checkpoint log record 114. In one embodiment, the structuring module 204 sends each log entry to the comparison module 206. The log entries may be sent as data structures demarcated within the checkpoint log record 114 or temporary structures holding copies of log entry data.

In another embodiment, the structuring module 204 dictates how the checkpoint log record 114 is parsed and traversed for application of the query expression 128. In this embodiment, the structuring module 204 may perform loop processing of the checkpoint log record 114. On each pass through the loop, the structuring module 204 may call the comparison module 206 to apply the query expression 128 to a log entry.

The comparison module 206 applies the query expression to each log entry supplied by the structuring module 204. The comparison module 206 indicates to the output module 208 which log entries satisfy the query expression. In certain embodiments, the comparison module 206 includes a parser configured to further parse each log entry into sub-entries. The sub-entries may be parsed out according to one or more parameters provided with, or as part of, the query expression 128. Once a sub-entry is parsed out, the comparison module 206 may apply a condition of the query expression 128 to the sub-entry. In this manner, the reduction module 200 is capable of applying conditions at a log entry level and log sub-entry level. This finer level of control in applying conditions limits extraneous "hits" because coincidental matches that cross boundaries between entries and sub-entries will not be registered as hits.

The output module 208 creates a condensed checkpoint log record comprising each of the log entries indicated by the comparison module 206 to have satisfied the query expression. Typically, the condensed checkpoint log record holds fewer log entries than a checkpoint log record 114. However, where every log entry of a checkpoint log record 114 comprises a "hit," the number of log entries in a condensed checkpoint log record may agree with the number of log entries in the corresponding checkpoint log record 114. Preferably, the format and sizes of condensed checkpoint log record are consistent with those for checkpoint log records 114. In this manner, the user 116 can process the condensed checkpoint log record using the same tools and utilities used with checkpoint log records 114.

In one embodiment, the output module 208 discards log entries in the checkpoint log record 114 that do not satisfy the query expression. Consequently, the checkpoint log record 114 may comprise fewer log entries and thus is a condensed checkpoint log record. In another embodiment, the output module 208 creates a new checkpoint log record. The output module 208 adds log entries from the original checkpoint log record 114 that satisfy the query expression to the new checkpoint log record. Consequently, the new checkpoint log record may comprise fewer log entries and thus is a condensed checkpoint log record.

Preferably, the output module 208 provides the condensed checkpoint log record to the user 116. In one embodiment, one or more condensed checkpoint log records are presented to a user by way of the UI 124. The output module 208 may make the condensed checkpoint log record available in memory, in a file, in a database, though an Application Programmer Interface (API) or though other techniques well known to those of skill in the art. In one embodiment, the output module 208 passes the condensed checkpoint log record to an Information Management System (IMS) formatting utility. The IMS formatting utility is the same report engine that is conventionally used to process checkpoint log records 114. However, with a condensed checkpoint log record, the IMS formatting utility presents few, if any, extraneous log entries to the user 116. The IMS formatting utility reads the data contained in the condensed checkpoint log record and formats the data in a manner suitable for a user 116, such as hexadecimal format. In this manner, the report retains the same look and feel, but provides more relevant results for programmers to review.

Figure 3:
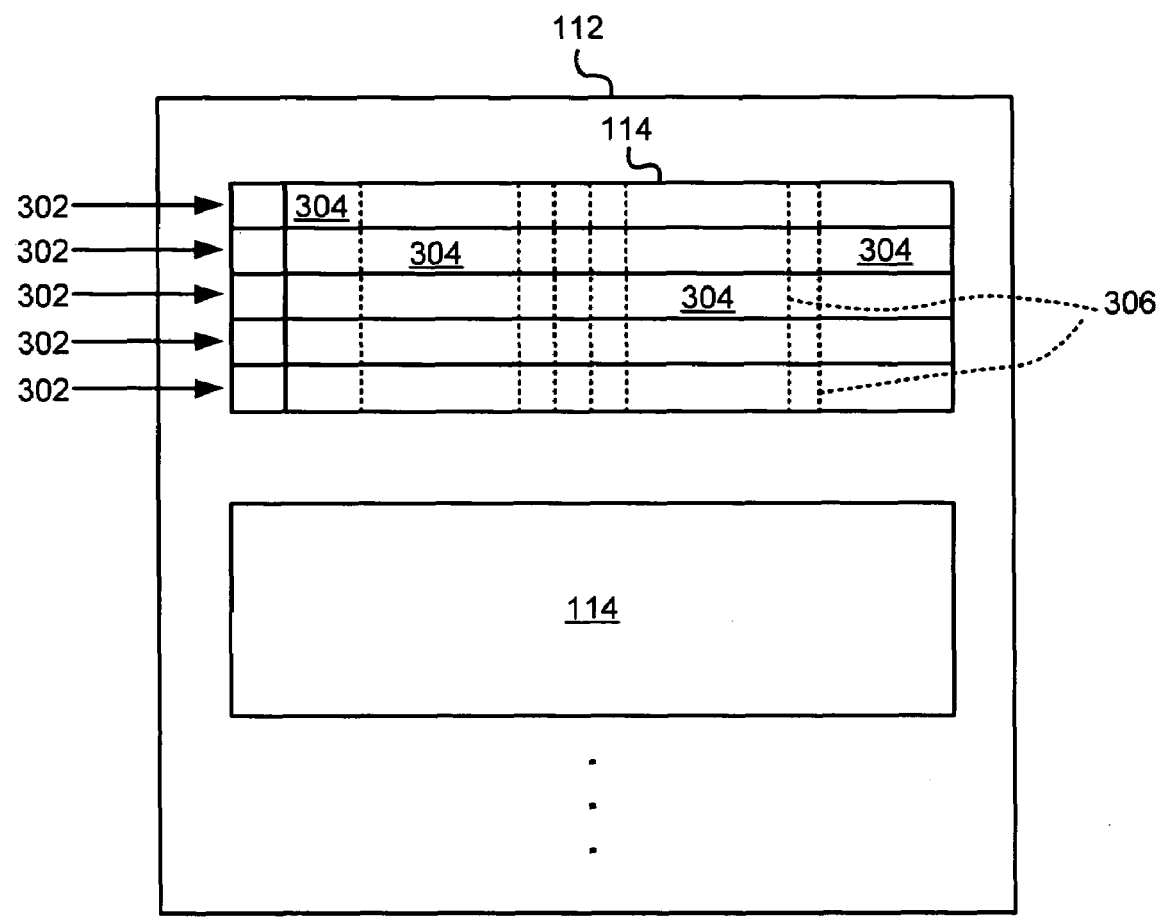
FIG. 3 is a block diagram illustrating a checkpoint log record comprising a plurality of log entries suitable for use with the present invention.

FIG. 3 illustrates a checkpoint log data set 112 comprising a plurality of checkpoint log records 114 suitable for use with the reduction module 200. Conventionally, as mentioned above, to optimize I/O when checkpoint log data sets 112 are generated, a plurality of log entries 302 are written to the storage device 104 and grouped within a single checkpoint log record 114. Each log entry 302 comprises one or more data values 304 arranged in a predefined order based on a predefined log entry format 306 (represented by vertical lines). The predefined log entry format 306 specifies the number of data values 304 in the log entry 302, the data or field type of each data value, and the length of each data value. The data or field type for each data value 304 may be Extended Binary Coded Decimal Interchange Code (EBCDIC), alphanumeric, character, number, decimal, or null.

In FIG. 3, the columns lines of the matrix imposed on the checkpoint log record 114 represent the log entry format 306 and the rows of the matrix represent log entries 302. Each cell in the matrix represents a data value 304. The width of each column represents the length of each data value 304. The checkpoint log record 114 depicted in FIG. 3 represents a typical log entry format 306 having a plurality of data values 304 with varying lengths. Each data value has a data type. For example, the first data value 304 in a log entry 302 may be a set of characters and the second data value 304 in a log entry 302 may be a decimal.

In a preferred embodiment, the log entry 302 is logically divided into data values 304. Alternatively, the log entry 302 is physically divided into data values 304. As used herein, logical structuring of the log entry 302 means that the log entry 302 is processed in such a manner that data values 304 are independently identified for application of a query expression condition. One form of logical structuring is use of fixed-width fields having defined offsets from the beginning of a record.

Logical structuring of checkpoint log records 114 provides several advantages. First, logical structuring retains the benefits of minimized I/O overhead when log entries 302 are initially stored on the storage device 104. Second, logical structuring requires no changes to the log entry storage routines, to the storage format for log entries, or to the storage requirements for the storage device 104. Finally, logical structuring provides the ability to apply the query expression condition to a single data value 304 within a log entry 302, or to the entire log entry 302, viewing the log entry 302 as one large bit pattern comprising an aggregation of the data values 304.

Preferably, each log entry 302 within a single checkpoint log record 114 has the same log entry format 306. The checkpoint log record 114 may hold up to a maximum number of log entries 302. In one embodiment, a checkpoint log record 114 holds up to one hundred twenty two log entries 302.

Figure 4:
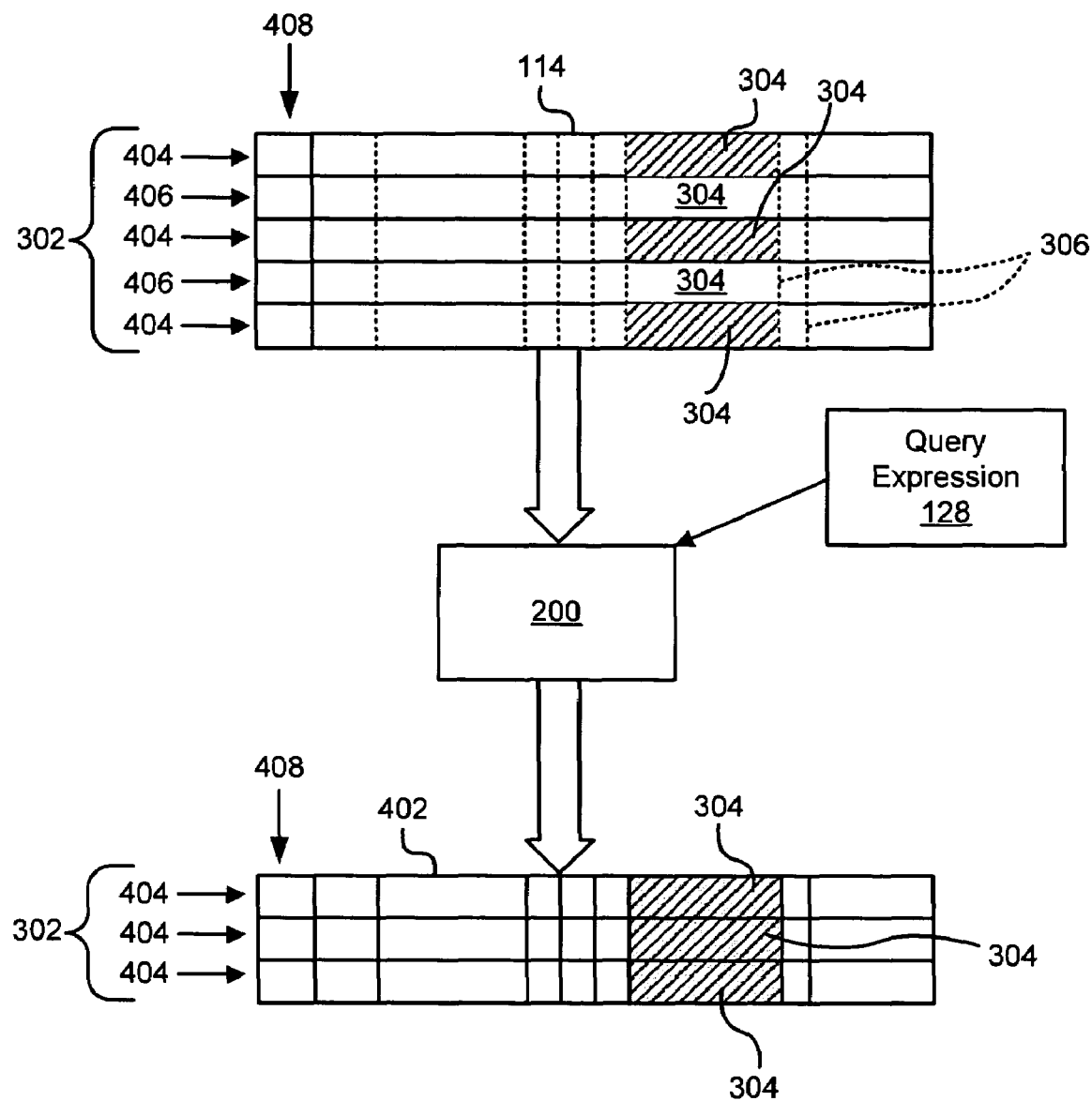
FIG. 4 is a block diagram illustrating logically the operation of one embodiment of an apparatus for condensing reported checkpoint log data in accordance with the present invention.

FIG. 4 illustrates the operation of the present invention on a checkpoint log record 114. The present invention condenses a checkpoint log record 114. Rather than containing all the log entries 302 of the checkpoint log record 114, a condensed checkpoint log record 402 contains the log entries 404 satisfying a query expression 128 and does not contain log entries 406 not satisfying the query expression 128.

The reduction module 200 identifies log entries 302 within the checkpoint log record 114 and applies a query expression 128 to each log entry 302. If the query expression 128 includes an offset value, the comparison module 206 (See FIG. 2) applies the query expression to a specific data value 304 located at the offset within the log entry 302. If the query expression 128 does not include an offset value, the comparison module 206 applies the query expression 128 to all of the data comprising the log entry 302, not just to a specific data value 304 within the log entry 302.

In the example depicted in FIG. 4, the comparison module 206 (See FIG. 2) may apply a query expression 128 comprising an offset value to data values 304 within log entries 302. In this example, the data values 304 within three of the log entries 404 satisfy the query expression 128, as denoted by shading. These three log entries 404 are included in the condensed checkpoint log record 402. Preferably, the entire log entry 404 is included in the condensed checkpoint log record 402, not just the data values 304 that satisfy the query expression 128. Two log entries 406 do not contain data values 304 that satisfy the query expression 128. These two log entries 406 are not included in the condensed checkpoint log record 402.

Those of skill in the art recognize various ways in which the output module 208 (See FIG. 2.) may assemble log entries 404 into a condensed checkpoint log record 402. A few examples are described below. Typically, entries 402 are located in an unstructured record 114 based on some order such as a time sequence. The reduction module 200 preferably preserves this ordering when the output module 208 combines log entries 404 to create a new condensed checkpoint log record 402.

Alternatively, the reduction module 200 creates a condensed checkpoint log record 402 by removing log entries 406 that fail to satisfy the query expression 128 from the original checkpoint log record 1 14. Once all such log entries 406 are removed, the reduction module 200 may re-characterize the checkpoint log record 114 as a condensed checkpoint log record 402. In this manner, memory storing a checkpoint log record 114 may be optimally reused.

In one embodiment, the condensed checkpoint log record 402 includes a header 408. The reduction module 200 may incorporate the header 408 from the checkpoint log record 1 14 in the condensed checkpoint log record 402. Preferably, the reduction module 200 modifies the header 408 to appropriately describe the condensed checkpoint log record 402.

For example, the entry count portion of the header 408 may need to be modified to accurately reflect the number of log entries 404 included in the condensed checkpoint log record 402. Preferably, the reduction module 200 does not modify the entry length portion of the header 408 since the length of the log entries 404 in the condensed checkpoint log record 402 is preferably the same as the length of the log entries 404,406 in the original checkpoint log record 114.

In one embodiment, the condensed checkpoint log record 402 includes log entries 404 and a header 408 from a single checkpoint log record 114. This may be advantageous as the header 408 included with the condensed checkpoint log record 402 may include other information such as timestamps, log type information, and the like that is useful in utilizing the log entries 404. Alternatively, the reduction module 200 may combine log entries 404 from a plurality of checkpoint log records 114 into a single condensed checkpoint log record 402. Consequently, the condensed checkpoint log record 402 may include a header 408 indicating original checkpoint log records 114 for the log entries 404.

In one embodiment, the query expression 128 comprises at least one condition and at least one parameter. The condition comprises an operator such as "=," "<," ">," "<>," and the like. The parameter is preferably a data value. Preferably, the parameter has a type such as Extended Binary Coded Decimal Interchange Code (EBCDIC), alphanumeric, character, number, decimal, or null. An example query expression may be: "=00000001." The query parameter is "00000001" and the condition is "=." The reduction module 200 may use this example query expression 128 to search for data equal to "00000001" within a log entry 302 (See FIG. 3).

In certain embodiments, the query expression 128 comprises a compound expression made up of two or more query expressions joined by one or more boolean operators. The boolean operators are well known and include operators such as "and," "or," "not," and the like. Preferably, each log entry 302 that is a "hit" satisfies at least one query expression 128 of a compound query expression. Each query expression 128 in a compound query expression may include a separate parameter. Alternatively, one parameter may apply to all the query expressions of a compound query expression 128.

Preferably, the reduction module 200 is configured to parse an entry 302 based on a plurality of query expressions 128 that together form a compound query expression 128. An example compound query expression 128 may state "=89 OR=11." The comparison module 206 applies the compound query expression 128 to a log entry 302. If the log entry 302 contains a hit for either "=89" or "=11" then the log entry 302 is included in the condensed log record 402. Of course, the compound query expression 128 may include more than two query expressions.

In certain embodiments, the boolean operator may be binary as with "AND" and "OR" or unary such as "NOT." The operator may be included in the query expression 128 as a word or a symbol. Alternatively, the UI 124 may control how boolean operators are designated. For example, a first query expression 128 on the same line as a second query expression 128 and separated by a space may indicate an "AND" operator. Similarly, a first query expression 128 on a first line and a second query expression 128 on a separate line may indicate an "OR" operator. Preferably, the UI 124 also validates the query expressions 128 for proper syntax. If the syntax is not correct, the UI 124 may indicate an error.

Figure 5A:
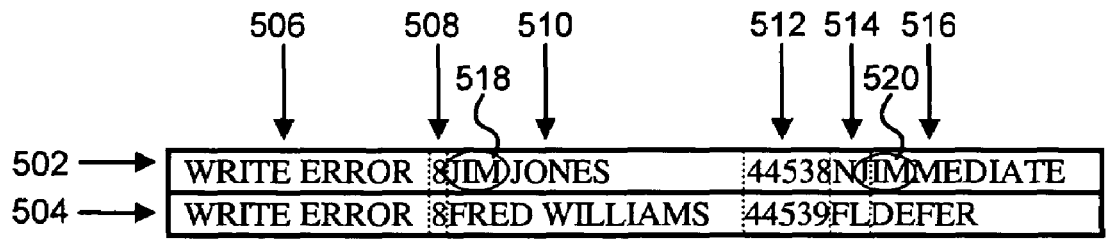
FIG. 5A is a chart illustrating the contents of example log entries.

FIG. 5A illustrates a representative example of two log entries 502,504 that the present invention logically defines in the checkpoint log record 114 illustrated in FIG. 3. A log entry format 306, represented by dashed lines forming columns, may logically divide the log entries 502,504 into data values 506,508,510,512,514,516.

In this example, the log entries 502,504 represent log data generated by an application 120. The first data value 506 is an operation name. The second data value 508 is a database number. The third data value 510 is a key identifier for a database entry. The fourth data value 512 is a process identifier. The fifth data value 514 is the state from which a database modification attempt was made. The sixth data value 516 is the type of action the database is to take.

In the example illustrated in FIG. 5A, the reduction module 200 applies a query expression 128 "='JIM'" to the log entries 502,504. Since there is no offset value in the query expression 128, the comparison module 206 applies the query expression 128 to all data within the log entries 502,504. The comparison module 206 identifies two hits 518,520 in log entry 502 and no hits in log entry 504. One hit 520 is a "false positive" since the hit requires characters from the fifth data value 514 and the sixth data value 516 to form a hit. This "false positive" is likely not useful to a user since the user likely intended to find hits lying completely within a single data value 304. However, the ability to search the entire log record 502,504 without considering data value boundaries is useful in some situations.

The output module 208 includes log record 502 in its entirety in the condensed checkpoint log record 402 since the log record 502 satisfies the query expression 128. Log record 504 is not included in the condensed checkpoint log record 402.

In one embodiment, the query expression 128 includes an exclude condition. The comparison module 206 log entries 302 that satisfy exclude conditions within the query expression 128 from the condensed checkpoint log record 402. For example, if the query expression 128 applied in the example illustrated by FIG. 5A is "exclude, ='JIM'" then the output module 208 will not include log entry 502 in the condensed checkpoint log record 402. Log entry 504, however, will be included in the condensed checkpoint log record 402 since log entry 504 does not satisfy the query expression 128.

Figure 5B:
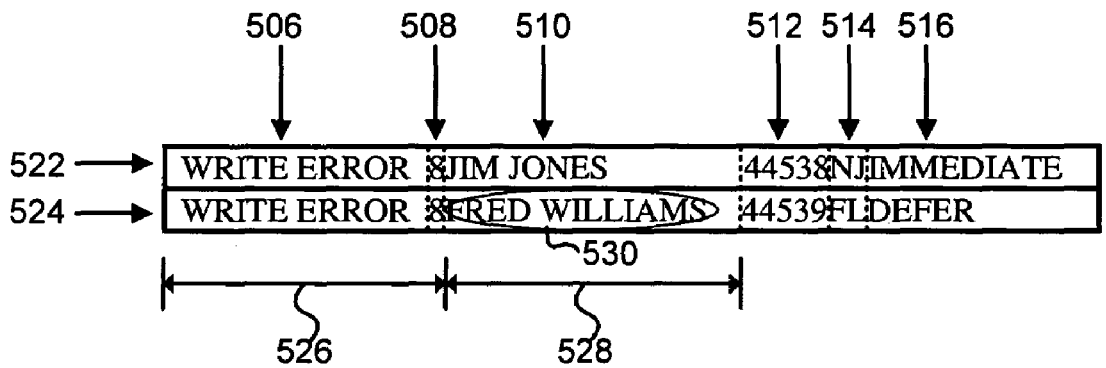
FIG. 5B is a chart illustrating the contents of example log entries.

FIG. 5B illustrates another representative example of two log entries 522,524. In this example, the reduction module 200 applies a query expression 128 containing an offset value 526 to the log entries 522,524. The comparison module 206 utilizes the offset value 526 to restrict the data to which the query expression 128 is applied. The comparison module 206 applies the query expression 128 to the set of data starting at the offset value 526 and ending with the offset value 526 plus a length value 528. Preferably, the offset value 526 and length value 528 are both specified in units of bytes. The offset value 526 and/or length value 528, may, or may not, correspond to format boundaries 306.

Preferably, the input module 201 receives the offset value 526 as part of the query expression 128. In one embodiment the comparison module 206 infers a length value 528 from the length of the parameter in the query expression 128. Alternatively, the comparison module 206 infers the length value 528 from the type of the parameter in the query expression 128. In another embodiment, the input module 201 receives the length value 528 as part of the query expression 128. Preferably, the offset value 526 and length value 528 define a portion of the log entry 302 corresponding to a whole data value 304.

In the example illustrated in FIG. 5B, the reduction module 200 applies a query expression 128 "offset 14, length 17, ='FRED WILLIAMS'" to the log entries 522,524. In this example, the offset value 526 and length value 528 correspond to the third data value 510 of the log entries 522,524. Applying the query expression 128 to log entry 522 does not result in a hit. Applying the query expression 128 to log entry 524 does result in a hit 530.

The output module 208 (See FIG. 2) includes log record 524 in its entirety in the condensed checkpoint log record 402 since the log record 524 satisfies the query expression 128. Log record 522 is not included in the condensed checkpoint log record 402.

Figure 5C:
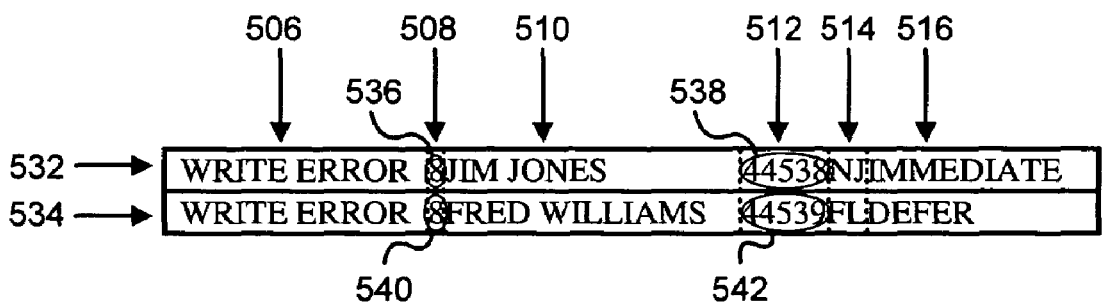
FIG. 5C is a chart illustrating the contents of example log entries.

FIG. 5C illustrates another representative example of two log entries 532,534. In this example, the reduction module 200 applies a query expression 128 containing a data type identifier to the log entries 532,534. A data type identifier specifies a particular data format such as Extended Binary Coded Decimal Interchange Code (EBCDIC), alphanumeric, character, numeric, decimal, or null. The comparison module 206 applies a query expression 128 comprising a data type identifier by inspecting all data in a log entry 302 to see if any of the data in the log entry 302 is of the same type as the type identifier. If the log entry 302 contains data matching the type identifier then there is a hit on the log entry 302. Preferably, a query expression 128 containing a type identifier does not contain a parameter.

In the example illustrated in FIG. 5C, the reduction module 200 applies a query expression 128 "type 'number'" to the log entries 532,534. The comparison module 206 identifies two hits 536,538 on log entry 532 and two hits 540,542 on log entry 534. The hits 536,538,540,542 are due to the fact that the second data value 508 and the fourth data value 512 are both number type data values.

The output module 208 includes both log records 532,534 in their entirety in the condensed checkpoint log record 402 since both log record 532,534 satisfy the query expression 128. Although both log records 532,534 contain two hits in the example illustrated in FIG. 5C, a single hit may be sufficient for the output module 208 to include the records 532, 534 in the condensed checkpoint log record 402.

In certain checkpoint log records 114, log entries immediately preceding and immediately following a log entry 302 of interest can offer clues about a potential software error. Consequently, in certain embodiments, the user provides a context indicator, i.e., 5. The context indicator may comprise a numerical value representative of the number of log entries 302 before and after a hit the user desires to have included in the condensed checkpoint log record 402. The comparison module 206 may reference the context indicator when assembling the log entries 404.

Figure 6:
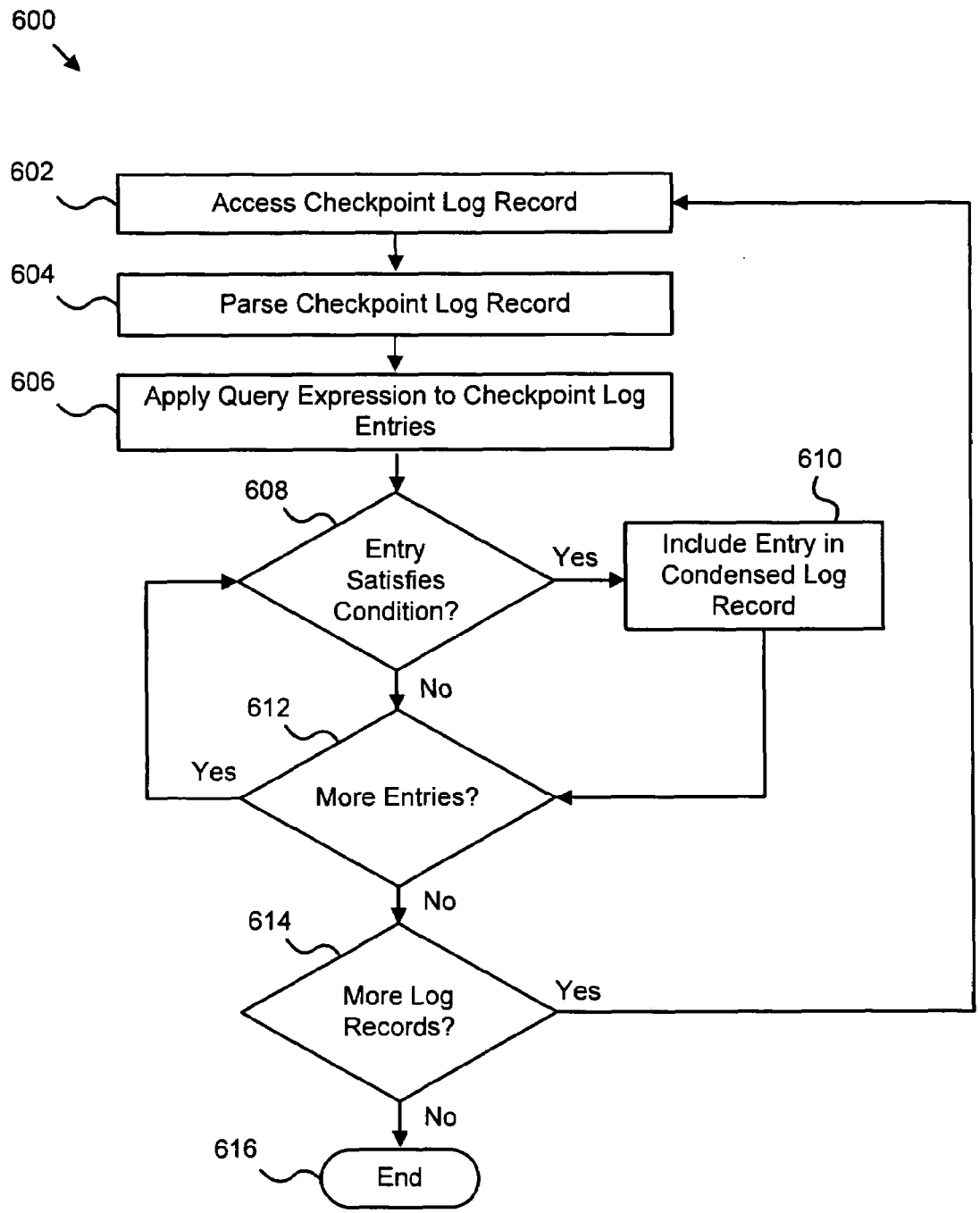
FIG. 6 is a flow chart diagram illustrating one embodiment of a method for condensing reported checkpoint log data in accordance with the present invention.

FIG. 6 is flow chart diagram illustrating one embodiment of a method 600 for analyzing checkpoint log data in accordance with the present invention. Preferably, the method 600 can be implemented in a conventional system by modifying computer readable code in order to implement the reduction module 126 described above in FIG. 1. The method 600 is initiated when a user desires to review log entries that satisfy a query expression 128. Initially, a user defines one or more conditions and one or more parameters. In certain embodiments, the parameters include a checkpoint log data set indicator that names a checkpoint log data set 112 of interest to the user. The UI 124 validates the query expression 128.

Once a user provides a valid query expression 128, the record handler 202 accesses 602 at least one checkpoint log record 114. In certain embodiments, the record handler 202 may access 602 a subset of checkpoint log records 114 in a checkpoint log data set based on a time range provided as one of the parameters. The structuring module 204 parses 604 the checkpoint log record 114 into one or more log entries 302.

Next, the comparison module 206 applies 606 the query expression 128 to each log entry 302.

Next, a determination 608 is made whether a log entry 302 satisfies the query expression 128. If the log entry 302 satisfies the query expression 128, the output module 208 includes 610 the log entry 302 in a condensed checkpoint log record 402.

If not, a determination 612 is made whether more log entries 302 of the checkpoint log record 114 exist. If more log entries 302 exist, the method 600 returns to step 608 and a subsequent log entry 302 is evaluated against the query expression 128.

If no more log entries 302 exist, a determination 614 is made whether more checkpoint log records 114 exist. If so, the method 600 returns to step 602 and accesses a subsequent checkpoint log record 114. If not, the method 600 ends 616.

The present invention permits condensing checkpoint log data on a log entry level in addition to the checkpoint log record level. The present invention minimizes false positives and the size of search results to ease storage requirements and minimize checkpoint log data analysis time. In addition, the present invention may be integrated with conventional report engines, user interfaces, storage devices, and operating systems. In one embodiment, the present invention may be deployed by including the reduction module 200 with a conventional reporting module. In this manner, the benefits of the present invention can be realized with minimal changes to existing systems. In addition, the benefits of storing log entries 302 in checkpoint log records 114 are retained.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as data value programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

What is claimed is:

1. A method of generating condensed reports of checkpoint log data, the method comprising:
   reading a log record comprising a plurality of log entries that report on the status of, and events occurring in, a software application that generates the log entries, wherein status and event information in the plurality of log entries is relevant to a determination of errors and inefficiencies in the software application;
   reading a log entry count and a log entry size from a header of the log record;
   demarcating log entries within the log record with information from the log entry count and the log entry size;
   parsing the log record into log entries;
   receiving a query expression;
   applying the query expression against each parsed log entry; and
   generating a condensed log report comprising only log entries that satisfy the query expression.

2. The method of claim 1, further comprising discarding log entries in the log record that do not satisfy the query expression.

3. The method of claim 1, further comprising constructing a new log record comprising log entries satisfying the query expression.

4. The method of claim 1, further comprising providing the query expression with at least one condition and at least one parameter.

5. The method of claim 4, further comprising providing the query expression with an offset value that defines an offset within each log entry for applying the query expression.

6. The method of claim 4, further comprising selecting a parameter type from the group consisting of Extended Binary Coded Decimal Interchange Code (EBCDIC), alphanumeric, character, number, decimal, and null.

7. The method of claim 1, further comprising selecting a type identifier for the query expression from the group consisting of Extended Binary Coded Decimal Interchange Code (EBCDIC), alphanumeric, character, numeric, decimal, and null.

8. The method of claim 1, further comprising providing the query expression with an exclude condition configured to exclude log entries satisfying the condition from the condensed log record.

9. The method of claim 1, further comprising providing the condensed log record to a user.

10. The method of claim 9, further comprising passing the condensed log record to an Information Management System (IMS) formatting utility configured to format binary data in the condensed log report in a format suitable for the user.

11. The method of claim 1, further comprising accessing log records within a set of log records based on a time stamp.

12. A method of condensed reporting of checkpoint log data, the method comprising:
   receiving a query expression with an offset value that defines an offset for applying the query expression to an individual log entry and a time range from a user;
   retrieving a plurality of checkpoint log records from a storage device with a time stamp within the time range provided by the user;
   reading each checkpoint log record comprising a plurality of log entries that report on the status of, and events occurring in, a software application that generates the log entries;
   reading a log entry count and a log entry size from a header of each checkpoint log record;
   utilizing the log entry count and the log entry size in the header of each checkpoint log record to demarcate log entries in each checkpoint log record;
   parsing each checkpoint log record into log entries, each log entry having a common format;
   applying the query expression against each parsed log entry;
   generating a condensed checkpoint log report comprising log entries satisfying the query expression from multiple checkpoint log records; and
   presenting the condensed checkpoint log report to an Information Management System formatting utility configured to convey binary data in the condensed checkpoint log record in a hexadecimal format.

* * * * *